United States Patent

Huddleston et al.

Patent Number: 6,119,360
Date of Patent: Sep. 19, 2000

[54] ELECTRODE ANGULAR MEASURING DEVICE

[76] Inventors: Kevin Huddleston, 886 W. Lindenwood Cir., Ormond Beach, Fla. 32174; Curtis Harreld, 1442 Admiral Nimitz Ave., Daytona Beach, Fla. 32124

[21] Appl. No.: 09/198,227

[22] Filed: Nov. 23, 1998

[51] Int. Cl.$^7$ ................. G01B 5/24; G01B 3/18
[52] U.S. Cl. ................. 33/833; 33/813; 33/532; 33/549
[58] Field of Search ............... 33/833, 783, 784, 33/792, 793, 794, 806, 813, 832, 531, 532, 534, 549, 555

[56] References Cited

U.S. PATENT DOCUMENTS 3,327,399  6/1967  Gershman .................. 33/532
4,875,294  10/1989  Jefferson .................. 33/792
5,012,592  5/1991  Greenslade .................. 33/549

Primary Examiner—Christopher W. Fulton

[57] ABSTRACT

A device that is both square and multi-sided in configuration. At equally spaced intervals a variety of hole sizes (A,B,C,D) are drilled through the base (8). The base (8) is coupled to a L-shaped ratchet mechanism (6). The ratchet mechanism (6) rotates in both directions about the base (8). The ratchet mechanism (6) provides selective positioning about the base (8). A micrometer (4) is attached to the ratchet mechanism (6). A scale of measurement is provided on the micrometer (4). The base (8) surface represents the zero measuring point. The object being measured is interposed into the appropriate diameter through the base (8). The object is pushed through the base (8) until contact between the object and the micrometer (4) shaft occurs. Adjusting the micrometer (4) clockwise moves the objects grinding taper flush with the base (8) surface. The value measured on the micrometer (4) represents the angle of the object being measured.

1 Claim, 1 Drawing Sheet

| ITEM | FIG 1 - DESCRIPTION |
|------|----------------------|
| 4 | Micrometer |
| 6 | Ratcheting Mechanism |
| 8 | Base |
| 10 | 3/16" Locking Ball |
| 12 | Spring |
| 14 | 1/4-20x5/32" Set Screw |
| 16 | 1/4-20x1/4" Button Head Screw |
| 18 | 1/4" Flat Washer |
| 20 | 10/32 - 1/8" Set Screw |

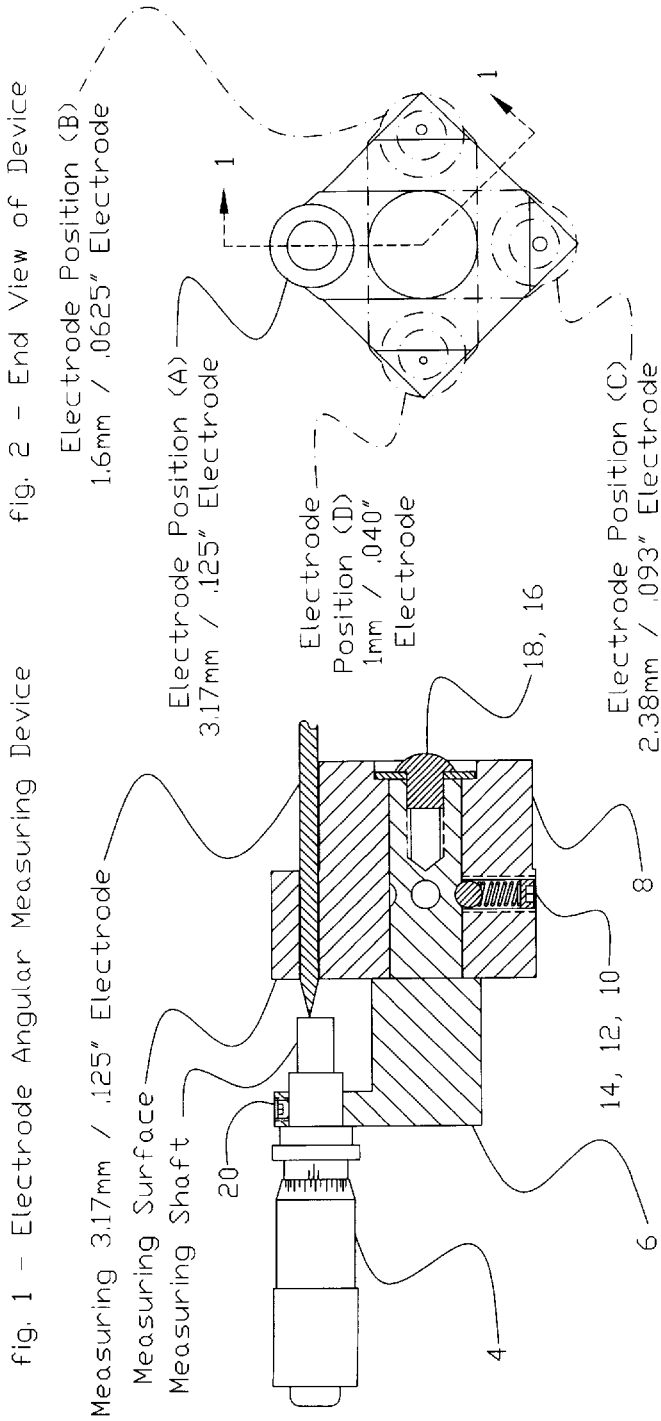
Fig. 1 - Electrode Angular Measuring Device
Fig. 2 - End View of Device
| ITEM | FIG 1 - DESCRIPTION |
|---|---|
| 4 | Micrometer |
| 6 | Ratcheting Mechanism |
| 8 | Base |
| 10 | 3/16" Locking Ball |
| 12 | Spring |
| 14 | 1/4-20x5/32" Set Screw |
| 16 | 1/4-20x1/4" Button Head Screw |
| 18 | 1/4" Flat Washer |
| 20 | 10/32 - 1/8" Set Screw |

ELECTRODE ANGULAR MEASURING DEVICE

BACKGROUND

1. Field of Invention

This instrument is used as a practical means to measure the grind angle of a tungsten electrode relating to the Gas Tungsten Arc Welding process.

2. Description of Prior Art

In the operation of the Gas Tungsten Arc Welding (G.T.A.W.) process, a tungsten electrode tip configuration is prepared. This is normally accomplished by grinding a angled taper at either or both ends of the tungsten electrode. The electrode tip configuration or geometry is a critical weld process variable. This variable requires routine maintenance.

DESCRIPTION OF PRIOR ART

The process requires replacing the tungsten electrode on a regular basis. Electrodes are replaced after re-grinding the electrode tip to their original angle or configuration. Manufacturer's throughout the world have recognized the importance of continuous process improvement. Manufacturer's are interested in being more competitive and reducing production time. They have learned to identify inconsistencies or weaknesses in the way a process operates. This is accomplished by paying close attention to critical process variables that influence a particular process. It has been generally accepted that the tungsten electrodes grind angle is a critical process variable. A variable that must be consistently prepared and measured. Therefore, the majority of manufacturers that utilize the G.T.A.W. process have accepted the need for process control. This is normally accomplished through documentation. A weld process control document used throughout the industry is known as a weld procedure specification. The weld procedure specification establishes the limits on weld process variables. This normally includes welding current, voltage, speed, gas, material type, and the tungsten electrodes grind angle. There exists a need to effectively measure the tungsten electrodes grind angle. The only device available for measuring a tungsten electrodes grind angle is a device known as a optical comparator. Optical comparators are extremely expensive and were originally designed for use in a precision measurement room. Optical comparators are typically used to measure the dimensional features of complex components. These components are normally produced in machining centers. Furthermore, they are not purchased for the sole purpose of measuring a tungsten electrodes grind angle. This would be both impractical and extremely expensive for the majority of welding fabricators. A device used specifically for measuring a tungsten electrodes grind angle does not exist within the industry.

OBJECTS AND ADVANTAGES

Therefore, besides the objects and advantages of the electrode angular measuring device described herein, several objects and advantages of the device are:

For the first time, provide the industry with a device designed specifically for measuring a tungsten electrodes grind angle.

To provide the industry with a practical, yet inexpensive means to measure a tungsten electrodes grind angle.

Unlike the optical comparator, provide the industry with a electrode angular measuring device that is less sensitive to contamination from grinding dust.

To provide the industry with a electrode angular measuring device that is a fraction of the size of a optical comparator.

To provide the industry with a electrode angular measuring device that cost hundreds, versus thousands of dollars, when compared to a optical comparator.

To provide welding fabricators with a means to inspect tungsten electrodes prepared by a vendor.

To provide welding inspectors with a device to verify the electrode grind angle is within the tolerance limits of the weld procedure specification.

To provide the industry with a electrode angular measuring device that will accommodate a variety of electrode sizes.

DRAWING FIGURES

In the drawing, drawing FIG. 1 is comprised of device components that are identified numerically. Located directly above FIG. 1 is a table describing each item numerically. Drawing FIG. 2 identifies each electrode position alphabetically A, B, C, and D. The electrode angular measuring device is illustrated in the drawing of which: FIG. 1 is a cross sectional view with its various components demonstrating electrode position for measurement. FIG. 2 is a end view illustrating the various electrode positions and their respective diameters.

REFERENCE NUMERALS IN DRAWING

4) Micrometer
6) Ratcheting Mechanism
8) Base
10) 3/16" Locking Ball
12) Spring
14) 1/4-20 × 5/32" Set Screw
16) 1/4-20 × 1/4" Button Head Screw
18) 1/4" Flat Washer
20) 10/32-1/8" Set Screw

DESCRIPTION—FIGS. 1 and 2

A typical embodiment of the present invention is illustrated in FIG. 1 (cross sectional view) and FIG. 2 (end view). Referring to FIG. 1, the device has a standard 1/2" micrometer 4 with a measuring scale in 0.001 of an inch graduations. A micrometer 4 body is attached to a L-shaped ratchet mechanism 6 through a precision machined diameter and secured in place by a 10/32-1/8" set screw 20. Attachment between ratcheting mechanism 6 and base 8 is accomplished by a 1/4-20×1/4" button head screw 16 and a 1/4" flat washer 18. Rotation between the assembly provides 360 degrees of freedom with a locking position every 90 degrees. A 3/16" locking ball 10 is forced into position against the shaft of ratcheting mechanism 6 by a spring 12 and a complementary 1/4-20×5/32" set screw 14. Referring to FIG. 2, each 90 degree position accommodates a different electrode diameter for angular measurement. The electrode angular measuring device is designed to accommodate the four most popular electrode sizes. This includes a 1 mm/0.040 of an inch diameter hole position (D), a 1.6 mm/0.0625 of an inch diameter hole position (B), a 2.38 mm/0.093 of an inch diameter hole position (C), and a 3.17 mm/0.125 of an inch diameter hole position (A). Micrometer 4 can be calibrated or adjusted to read zero whenever the micrometer shaft is in contact with base 8 measuring surface. This is accomplished by the loosening of set screw 20 and adjusting micrometer 4 nutate (to and fro) its base 8. Clockwise adjustment of set screw 20 secures its position. Rotation of micrometer 4 counter-clockwise provides up to 12.7 mm/1/2" of travel for measuring an electrodes grind angle taper length.

OPERATION—FIG. 1

In practicing the device, micrometer 4 is aligned to the appropriate electrode position by means of ratcheting mechanism 6. Micrometer 4 zero point is verified by rotating micrometer 4 clockwise until contact between the measuring shaft (FIG. 1) and the measuring surface (FIG. 1) occurs. This operation ensures the electrodes grinding angle taper length is measured correctly. In order to provide adequate clearance, micrometer 4 is then rotated in a counter-clockwise direction prior to the electrode being interposed into the opposite side of the device. This clearance allows the electrode grind angle taper to extend slightly beyond the measuring surface (FIG. 1). Once the electrode is positioned sufficiently through base 8, micrometer 4 is rotated clockwise until contact between the electrode and micrometer shaft (FIG. 1) occurs. Further clockwise adjustment slowly pushes the electrodes grinding angle taper closer to the measuring surface (FIG. 1). This continues until the electrode grinding angle taper is flush with base 8 measuring surface (FIG. 1). It is at this position that the electrode grinding angle taper length is measured.

SUMMARY/RAMIFICATIONS AND SCOPE

It is generally accepted that the length of the electrode grind angle taper not exceed one and a half times the electrode diameter. For this reason a 12.7 mm/½" micrometer was selected for the device. For certain applications, after grinding the electrode angle, a small flat is ground at the tip of the electrode.

This flat is ninety degrees to the electrodes centerline. The flat minimizes losing the electrode tip into the welding pool or subsequent weld. When using this device, measuring the electrodes grind angle taper length should be conducted prior to grinding a flat at the electrode tip. In practice, grinding a flat at the electrodes tip is normally the final grinding operation. This new instrument known as a Electrode Angular Measuring Device operates on the principles of triangulation. The tungsten electrode grinding angle is divided into two equal triangles. Calculating the electrodes total grinding angle requires two components from one triangle to solve the problem. This would include the triangles opposite leg and its adjacent leg. The opposite leg of the triangle is simply the electrode radius. The adjacent leg of the triangle is determined by measuring from the electrode tip to the point at which the grind angle taper ends. This dimension is measured with the electrode angular measuring device. The next operation involves dividing the opposite component by the adjacent component, or the ratio of these two dimensions. This is followed by the arc tangent function which provides one half of the electrodes total grind angle. The angle is then multiplied by a factor of two in order to obtain the electrodes compound angle. Fortunately for the end user, calculating the electrode grind angle is not necessary. The end user will simply refer to a reference guide. A reference guide of dimensions and their corresponding grind angles will be provided with each device. This eliminates the technical aspect of the device making it user friendly. In practice, an individual may measure a 1.6 mm/0.0625 diameter electrodes grinding angle taper and find it to be 4.5 mm/0.177 of an inch in length.

SUMMARY/RAMIFICATIONS AND SCOPE

The user simply refers to the reference guide for its corresponding grind angle of twenty degrees. The reference guide will be made available in both a pamphlet size and a poster size for a users particular needs. An example of the reference guide titled "Reference Guide Of Dimensions and Angles" has been submitted as page twelve for review. The example however does not represent the reference guide in its entirety. As previously indicated, this device is the first of its type. It was designed for measuring the grind angle of tungsten electrodes for the Gas Tungsten Arc Welding process. Its application however should not be limited to a singular manufacturing process of any type. In addition, its use should not be limited to a specific welding process. The electrode angular measuring device may be used on a similar welding process known as the Plasma Arc Weld process. The Plasma Arc Welding process also utilizes a tungsten electrode that must be ground; as in grinding, to a specific geometry. The device could therefore be used for measuring electrode grind angles for the Plasma Arc Welding process as well. Although the prior description is quite specific, it should not be construed as limiting the scope of the device but as merely providing an illustration of its presently preferred design. For example, the shape of the device can be slightly altered to take on a different look. Modifications of the device could also include a magnetic base that swivels or tilts. This feature would allow the electrode to be measured both horizontally or vertically. A digital micrometer or dial indicator may be substituted for the present design with a dual range of measurement for both the Metric and the British system.

The next generation of the device will perform calculations by means of an integrated chip and display the electrodes angle rather than a dimension. This eliminates the need for the reference guide of dimensions and angles altogether. The size of the device may also be increased in order to produce a model with a larger scale of measurement. A device with greater precision could also be produced by adding a light source and magnification device. For high amperage welding applications the maximum electrode size of the device may also be expanded to measure electrodes as large as 6.35 mm/¼" in diameter. The device could also be altered to accommodate measuring every tungsten diameter produced throughout the industry rather than a limited number. Additionally, this device could be designed into a new generation tungsten electrode grinding system. This would combine the grinding operation and the measuring operation into one machine or process. Thus, the scope of this device should be determined by the appended claims and their legal equivalents, rather than by the examples given.

| REFERENCE GUIDE OF DIMENSIONS AND ANGLES | | | | | |
|---|---|---|---|---|---|
| 1.6 MM/.0625" DIAMETER ELECTRODE | | | 1.6 MM/.0625" DIAMETER ELECTRODE | | |
| TAPER LENGTH | | DEGREES | DEGREES | TAPER LENGTH | |
| 11.30 mm | .445" | 8.03 | 8 | 11.35 mm | .447" |
| 11.18 mm | .440" | 8.12 | 9 | 10.09 mm | .397" |
| 11.05 mm | .435" | 8.22 | 10 | 9.07 mm | .357" |
| 10.92 mm | .430" | 8.31 | 11 | 8.24 mm | .325" |
| 10.80 mm | .425" | 8.41 | 12 | 7.55 mm | .297" |
| 10.67 mm | .420" | 8.51 | 13 | 6.97 mm | .274" |
| 10.54 mm | .415" | 8.61 | 14 | 6.46 mm | .255" |
| 10.41 mm | .410" | 8.72 | 15 | 6.03 mm | .237" |
| 10.29 mm | .405" | 8.82 | 16 | 5.65 mm | .222" |
| 10.16 mm | .400" | 8.93 | 17 | 5.31 mm | .209" |
| 10.03 mm | .395" | 9.05 | 18 | 5.01 mm | .197" |
| 9.91 mm | .390" | 9.16 | 19 | 4.74 mm | .187" |
| 9.78 mm | .385" | 9.28 | 20 | 4.50 mm | .177" |
| 9.65 mm | .380" | 9.40 | 21 | 4.28 mm | .169" |
| 9.53 mm | .375" | 9.53 | 22 | 4.08 mm | .161" |
| 9.40 mm | .370" | 9.66 | 23 | 3.90 mm | .154" |
| 9.27 mm | .365" | 9.79 | 24 | 3.73 mm | .147" |
| 9.14 mm | .360" | 9.92 | 25 | 3.58 mm | .141" |
| 9.02 mm | .355" | 10.06 | 26 | 3.44 mm | .135" |
| 8.89 mm | .350" | 10.20 | 27 | 3.31 mm | .130" |
| 8.76 mm | .345" | 10.35 | 28 | 3.18 mm | .125" |
| 8.64 mm | .340" | 10.50 | 29 | 3.07 mm | .121" |
| 8.51 mm | .335" | 10.66 | 30 | 2.96 mm | .117" |
| 8.38 mm | .330" | 10.82 | 31 | 2.86 mm | .113" |

-continued

REFERENCE GUIDE OF DIMENSIONS AND ANGLES

| 1.6 MM/.0625" DIAMETER ELECTRODE | | | 1.6 MM/.0625" DIAMETER ELECTRODE | | |
|---|---|---|---|---|---|
| TAPER LENGTH | | DEGREES | DEGREES | TAPER LENGTH | |
| 8.26 mm | .325" | 10.98 | 32 | 2.77 mm | .109" |
| 8.13 mm | .320" | 11.16 | 33 | 2.69 mm | .105" |
| 8.00 mm | .315" | 11.33 | 34 | 2.6- mm | .102" |
| 7.87 mm | .310" | 11.51 | 35 | 2.52 mm | .099" |
| 7.75 mm | .305" | 11.70 | 36 | 2.44 mm | .096" |
| 7.62 mm | .300" | 11.89 | 37 | 2.37 mm | .093" |
| 7.49 mm | .295" | 12.09 | 38 | 2.31 mm | .091" |
| 7.37 mm | .290" | 12.30 | 39 | 2.24 mm | .088" |
| 7.24 mm | .285" | 12.51 | 40 | 2.18 mm | .086" |
| 7.11 mm | .280" | 12.74 | 41 | 2.12 mm | .084" |
| 6.99 mm | .275" | 12.97 | 42 | 2.07 mm | .081" |
| 6.86 mm | .270" | 13.20 | 43 | 2.02 mm | .079" |
| 6.73 mm | .265" | 13.45 | 44 | 1.96 mm | .077" |
| 6.60 mm | .260" | 13.71 | 45 | 1.92 mm | .075" |

I claim:

1. A device used to measure the amount of slope pertaining to the tapered end section of a tungsten electrode or other elongated instrument comprising:

a base that is both round and multi-sided in configuration and about said base a variety of holes drilled through said base;

a ratchet mechanism which is L-shaped and attached to said base, and rotates about said base with selective positioning;

a micrometer attached to said L-shaped ratchet mechanism, a scale of measurement being provided on said micrometer; and when an tapered object is interposed into said base toward said micrometer, and when said micrometer is rotated causing said tapered object to move to a position at said base, and said scale of measurement on said micrometer indicates an angular value of said tapered object.

\* \* \* \* \*